United States Patent [19]

Toase et al.

[11] Patent Number: 4,667,782

[45] Date of Patent: May 26, 1987

[54] CABLE HANDLING SYSTEM

[75] Inventors: Barry Toase, Durham; David Grant, Whickham, both of England

[73] Assignee: Eimco (Great Britain) Limited, England

[21] Appl. No.: 709,230

[22] Filed: Mar. 7, 1985

[30] Foreign Application Priority Data

Mar. 9, 1984 [GB] United Kingdom ................ 8406227

[51] Int. Cl.$^4$ .......................................... H02G 11/00
[52] U.S. Cl. .................... 191/12 R; 248/51; 248/64
[58] Field of Search .................. 191/12 R, 12.2 R; 212/131; 254/134.3, 134.5; 248/51, 63, 64, 74.1; 292/210

[56] References Cited

U.S. PATENT DOCUMENTS

| | | | |
|---|---|---|---|
| 2,758,863 | 8/1956 | Waymire et al. | 292/210 X |
| 3,388,222 | 6/1968 | Eriksson et al. | 191/12 R |
| 3,473,769 | 10/1969 | James | 191/12 R X |
| 3,882,288 | 5/1975 | Rasmussen | 191/12 R |
| 3,968,754 | 7/1976 | Lanfermann et al. | 104/172 R |
| 4,093,047 | 6/1978 | Wampfler | 191/12 R |

FOREIGN PATENT DOCUMENTS 3236992 4/1984 Fed. Rep. of Germany .... 191/12 R

Primary Examiner—Randolph A. Reese
Assistant Examiner—David F. Hubbuch
Attorney, Agent, or Firm—Trask, Britt & Rossa

[57] ABSTRACT

A system for handling cables and the like comprising a guide track (7) beneath which is fixed a plurality of space-apart retaining units (10). A trolley (8) is slidably mounted on the guide track (7) and accommodates a cable (5) which may be fixed at each retaining unit by pulling the trolley (8) along the track (7). By pulling the trolley in the opposite direction, the cable (5) may be released from each retaining unit.

11 Claims, 12 Drawing Figures

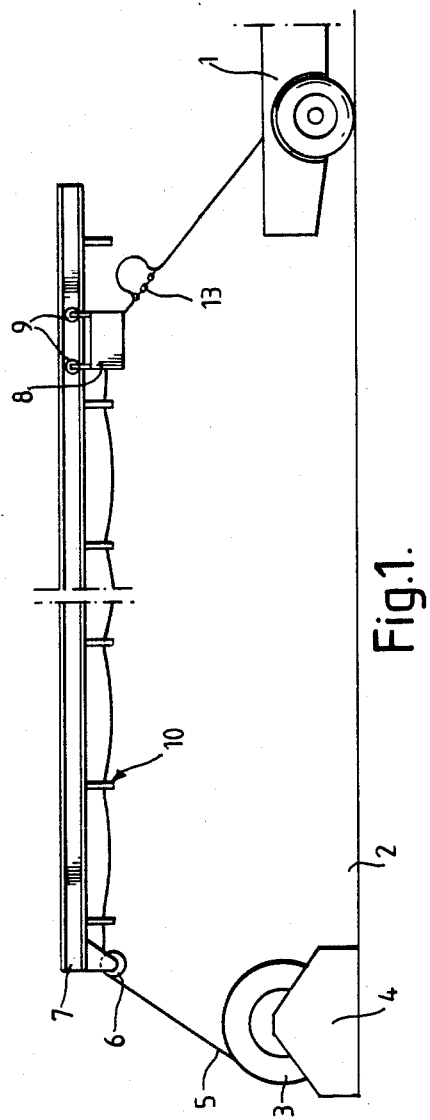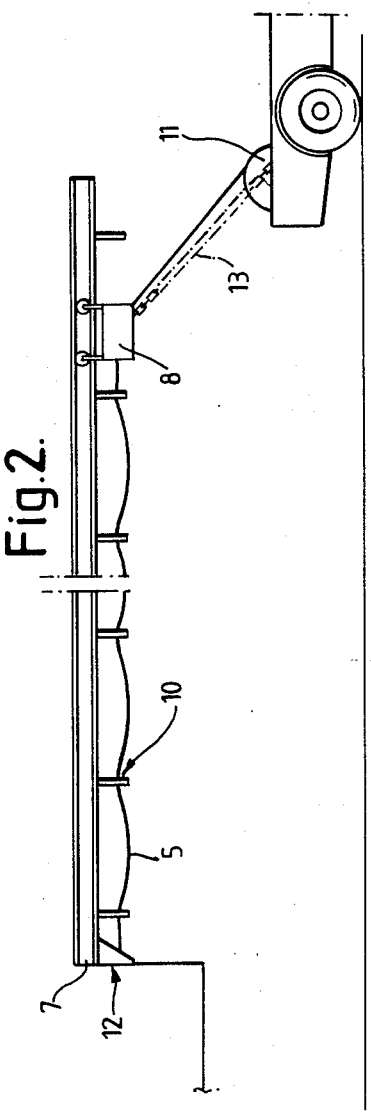

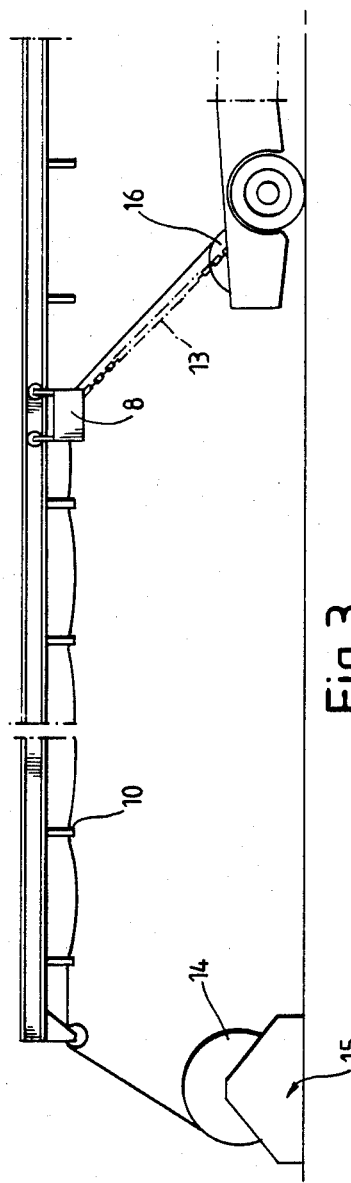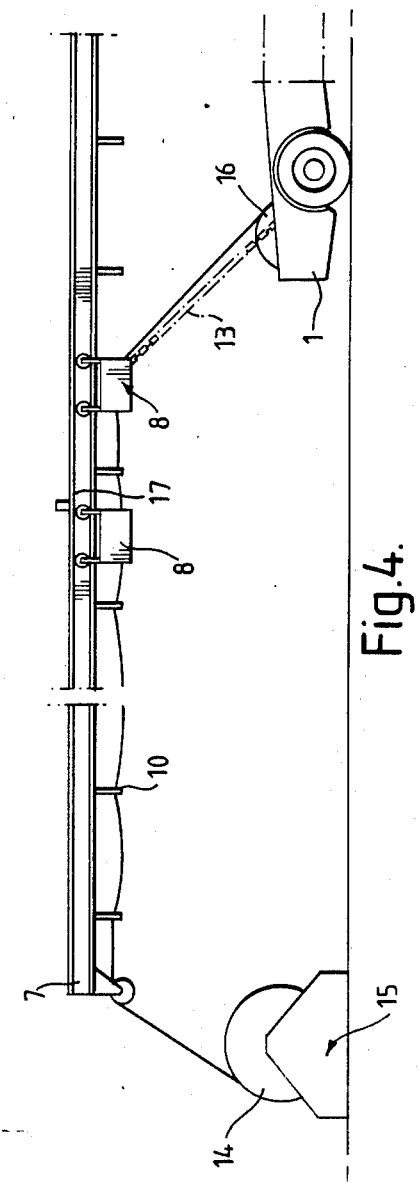

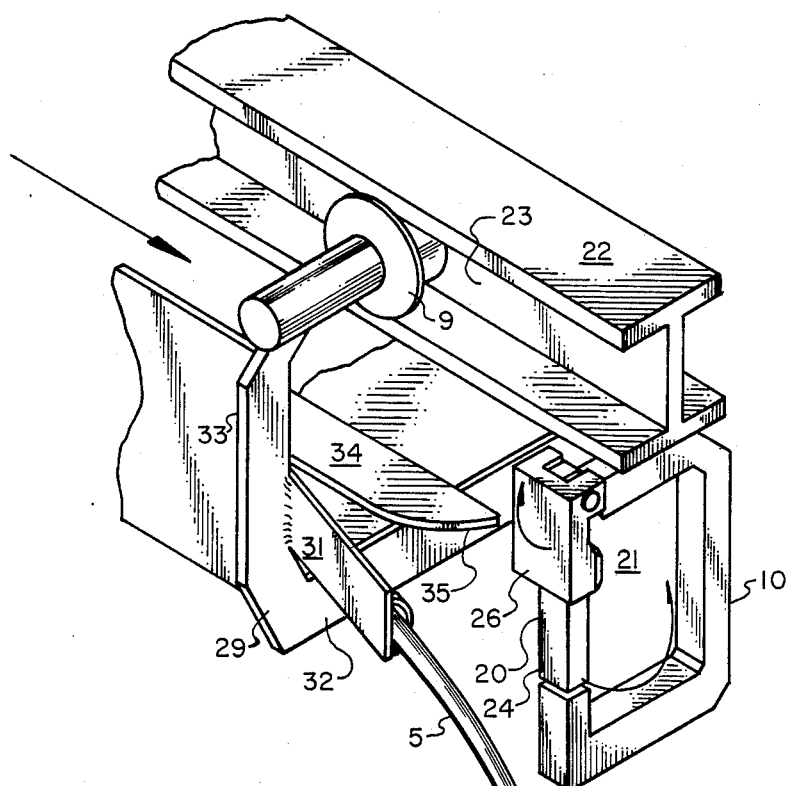
Fig. 9
Fig. 10
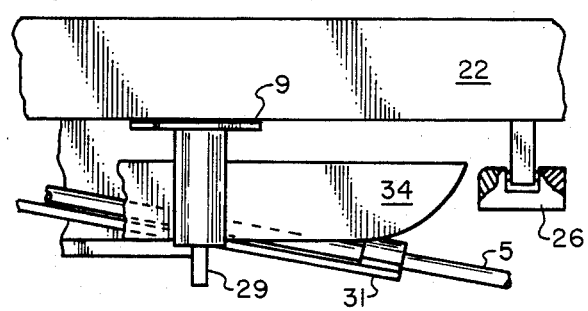
Fig. 11
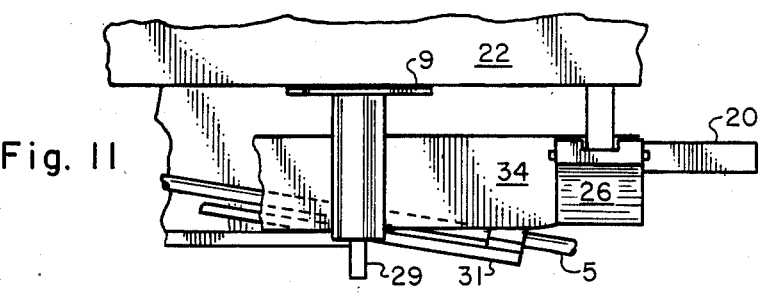
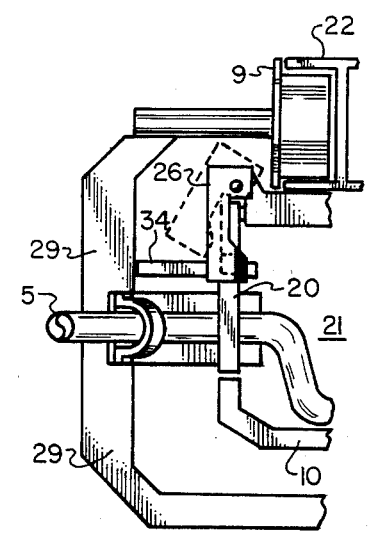
Fig. 12

CABLE HANDLING SYSTEM

BACKGROUND OF THE INVENTION

Field

This invention relates to a system for handling flexible elongate members such as cables, hoses and chains.

A particular application for the invention is concerned with a system for handling electric cables in a mine. Electrically powered vehicles are often used in mines. These are powered via cables. The cables lie in the roadway of the mine where the vehicles are travelling and are therefore in danger of being damaged. This causes high costs maintenance and repair apart from the danger of an electrical wire becoming exposed due to damage of the cable.

SUMMARY OF THE INVENTION

According to the present invention there is provided apparatus for handling a flexible elongate member. The apparatus comprises a feeder unit mounted for movement along a predetermined path, and at least one fixed retaining unit mounted adjacent that path. The retaining unit has an opening defined therein for reception of the elongate member. The unit has a first condition in which the elongate member may be received into or withdrawn from the opening, and a second condition in which the elongate member is retained in said opening. The feeder unit includes means for feeding the elongate member into the opening and then for altering the retaining unit from the first condition to the second condition whilst moving along the predetermined path in one direction. The unit also includes means for altering the condition of the retaining unit from the second condition to the first condition and withdrawing the elongate member from the opening whilst the feeder unit is moving in the opposite direction along the path.

Preferably the retaining unit comprises a loop including an opening which may be closed by a latching arrangement.

Preferably this latching arrangement comprises a latch member which is, in its equilibrium position, closed to form a closed loop so that any elongate member within the loop is retained firmly. The feeder unit, as it moves along its predetermined path with respect to the retainer unit, needs only include means to move the latch member out of its equilibrium position and hold it open until the elongate member has been passed through the opening. The latch member automatically closes when the opening means have passed through the retaining unit.

More preferably the system includes a plurality of retaining units so that the elongate member can be fixed at a plurality of positions along the path.

Even more preferably the retaining units are fixed onto an overhead mounting on a ceiling. In this construction the elongate member and the retaining units are retained close to the ceiling away from the working area on the floor.

The apparatus may be used for any flexible elongate member such as chains but it is particularly useful for hoses or for electrical cables.

Such a system is particularly useful in mining applications where vehicles are powered from electrical cables. It is important in such environments that the cables are not damaged for reasons of reducing potential maintenance and repair costs as well as to improve operational safety. If the cables are retained firmly in the retaining units overhead, the cables are well away from the roadway where the vehicles are moving. In this way the cables can be kept out of the danger area.

If a vehicle, powered by an electric cable, is moving along a mine roadway it is preferable that the length of cable is variable and that there is some way of accommodating the extra length of cable. Typically this is achieved by storing the cable on a reel. This reel may be mounted at one end of a mine with the vehicle attached to one end of the reel mounted cable. In this arrangement, any movement of the vehicle away from the reel pulls the cable off the reel. In the invention the feeder unit is fixedly mounted on the cable so that movement of the vehicle pulls the cable and therefore the feeder unit with respect to the retaining units. In this case the elongate member must be movable with respect to the retaining unit when it is in its retaining condition, i.e. while the elongate member is retained in the retaining unit it is slidable with respect to the retainer unit.

An alternative system is to accommodate a reel on the vehicle to be powered by the cable. The end of the cable is attached to an electrical connection in the mine. As the vehicle moves away from this fixed point the cable is reeled out from the vehicle. In this case the feeder unit is fixed with respect to the vehicle and the cable is slidable with respect to the feeder unit. In its retained condition the elongate member does not need to be moveable with respect to the retainer unit.

Preferably the predetermined path of the feeder unit with respect to the retaining units is defined by a guide track along which the feeder unit slides or rolls. The feeder unit is mounted along the guide track so that it is held in contact with the track.

Preferably the feeder unit is in the form of a trolley which rolls along the guide track which joins the retaining units.

A useful embodiment of the invention includes retaining units in the forms of overhead hooks. Each of these hooks includes a vertical latch which forms a closed loop when closed. The overhead hooks are mounted to be substantially perpendicular to the guide track which joins the retaining units. The feeder unit has a first end and a second opposite end. The elongate member is mounted on the feeder unit so a to be positioned generally diagonal to the direction of movement of the feeder unit. The elongate member is mounted on the feeder unit at a height approximately level with the centre of the loop defined within the hook. Movement of the feeder unit in a direction perpendicular to the plane of the hook tends to pass the elongate member through the opening formed in the side of the hook. Thus at the first end of the feeder unit the elongate member is mounted to be parallel with the centre of the loop defined within the hook. At the second end of the feeder unit the elongate member is mounted parallel to a position outside the hook and proximate the side of the opening. For example, if the feeder unit moves along the track towards the retaining unit with its first end leading, and the elongate member is within the loop, the trailing second end will be out of the loop so that movement in this direction will tend to unthread the elongate member from the retainer unit.

Movement of the feeder unit in an opposite direction causes the elongate member to be threaded into the unit.

Preferably the latching arrangement comprises two members which pivot in perpendicular directions. Preferably a first latching member depends vertically downwards to close the loop. This first latching member is pivoted at its top end so that it pivots in a plane parallel to the guide track. Preferably a second member is mounted on the hook and made pivotable in a direction perpendicular to the pivot of the first latching member. The second latching member includes stops for retaining the first latching member in position i.e. in its latched closed condition. The loop formed by the hook and the latching can only be opened by moving both the first and second latching members. This means that once the elongate member is within the closed loop it will not inadvertently escape from the retaining unit unless the feeder unit moves along the track to remove it.

According to the present invention there is further provided a method of handling a flexible elongate member extending from a feeder unit. The method comprises moving the feeder unit in one direction along a predetermined path adjacent at least one retaining unit. The movement of the feeder unit causes the elongate member to be entered into an opening defined in the retaining unit. Furthermore, movement of the feeder unit causes the retaining unit to switch from a first condition, in which the entry of the elongate member was permitted, to a second condition wherein the elongate member is prevented from moving out of the opening. A subsequent movement of the feeder unit in the opposite direction along the path causes the retaining unit to be switched from its second condition to its first condition. Further, the elongate member to drawn out of the opening.

BRIEF DESCRIPTION OF THE DRAWINGS

Several examples of systems in accordance with the invention will now be described with reference to the accompanying drawings in which:

FIG. 1 is a schematic view of a first system in accordance with the invention;

FIG. 2 is a schematic view of a second system in accordance with the invention;

FIG. 3 is a schematic view of a third system in accordance with the invention;

FIG. 4 is a schematic view of a fourth system in accordance with the invention;

FIG. 9 is an elevated perspective view of a feeder unit in association with a retaining unit;

FIG. 10 is a top view of the feeder unit in association with a retaining unit as shown in FIG. 9;

FIG. 11 is a top view of the feeder unit and retaining unit shown in FIG. 9 illustrating that retaining unit in its open position; and FIG. 12 is a side view of the feeder unit and retaining unit shown in FIG. 9 with the retaining unit in its open position as shown in FIG. 11.

DETAILED DESCRIPTION OF THE DRAWINGS

Figure 5:
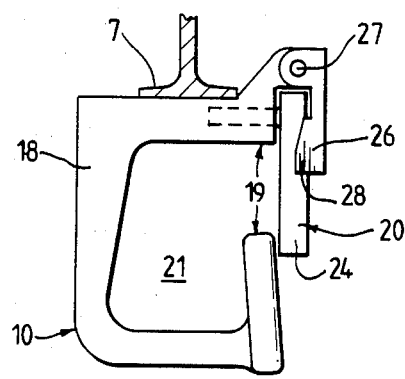
FIG. 5 is a schematic elevation of the retaining unit in its second or retaining condition.

The specific embodiments described are used to handle the cable used for supplying power to a vehicle 1 which is within a mine 2.

In a first embodiment of the invention (FIG. 1) a reel 3 is mounted on mounts 4. The reel 3 connections to an external power source to supply electricity to the cable 5, and to power rotate the reel 3. The mounting unit 4 is fixed to the mine floor 2. The cable 5 extends from the reel 3 to a guide pulley roller 6 mounted on the end of a track 7. At the leading edge of the cable 5 is fixedly mounted a feeder unit 8 which comprises a trolley like member which rolls via rollers 9 along guide tracks 7. The cable 5 is fixed to vehicle 1 to supply it with power.

Along guide tract 7 are connected a plurality of retaining units 10 which retain the cables when the feeder unit 8 has passed along that point on the track 7. When the vehicle 1 moves away from the reel 3 the vehicle 1 pulls the cable 5 and therefore the trolley feeder unit 8 along the track 7 and the reel 3 pays out cable. The cable 5 is slidable within each retaining unit 10. When the vehicle 1 moves back towards the reel 3 the reel 3 reels in the cable and pulls the trolley feeder unit 8 towards pivot roller 6. As it moves along the guide track in this direction the cable 5 to unthreaded from each retaining unit 10 successively.

The trolley 8 is attached to the vehicle 1 by a flexible chain 13, which is shorter than the length of cable 5 extending between feeder unit 8 and vehicle 1. This avoids the danger of direct pulling on cable 5.

Alternatively, as shown in FIG. 2, a reel 11 may be mounted on the vehicle 1. In this case the end of the cable is fixed to a bracket 12 on the guide track 7. An external power source is coupled to the bracket 12 and the end of the cable 5 to supply power to the cable 5. In this case the feeder unit 8 is connected to the vehicle by a chain 13 to hold it in a fixed position with respect to vehicle 1. In this alternate embodiment the cable 5 is slidable with respect to the feeder unit 8.

As the vehicle 1 moves away from fixed bracket 12 the reel 11 pays out cable. The feeder unit 8 is pulled along and the cable 5 slides through the feeder unit 8. As the feeder unit 8 passes through each retaining unit 10 the cable 7 is threaded into the unit 10 and retained firmly therein. When the vehicle 1 moves in the opposite direction the reel 11 reels in the cable and pulls the feeder unit 8 towards bracket 12 and along track 7 unthreading the cable from each retaining unit 10 successively.

In an even more preferred system (FIG. 3) a reel 14, connected to the power supply 14 is fixedly mounted on the mine floor. The other end of the cable is wound onto a further reel 16 mounted on vehicle 1. In this case the cable is slidable both in the retaining unit 10 and the feeder unit 8. The feeder unit 8 is again connected to the vehicle via chain 13. The feeder unit 8 moves away from rigidly mounted reel 14 until all the cable has been paid out from the reel 14. The cable from reel 16 is then paid out to allow the vehicle 1 a further range of movement.

In a fourth system (FIG. 4) two reels 14 and 16 are mounted on the power generated unit 15 and vehicle 1 respectively. In this case two trolley units 8 are mounted in tandem. While the vehicle 1 is moving along the first length of track 67 where cable is being paid out from reel 14 the two feeder units move in tandem and leave the cable retained in units 10. Once the feeder units 8 comes up against a stop 17 the reel 16 starts to pay out cable. Therefore, only one feeder unit 8 continues to move. That being the one which is connected to the vehicle by chain 13.

Figure 6:
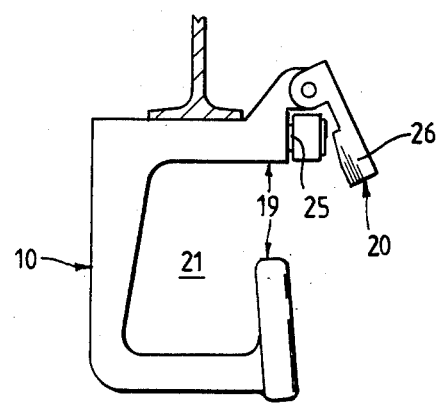
FIG. 6 is a schematic elevation of the retaining unit in its first condition i.e. its receiving and withdrawing position.
Figure 7:
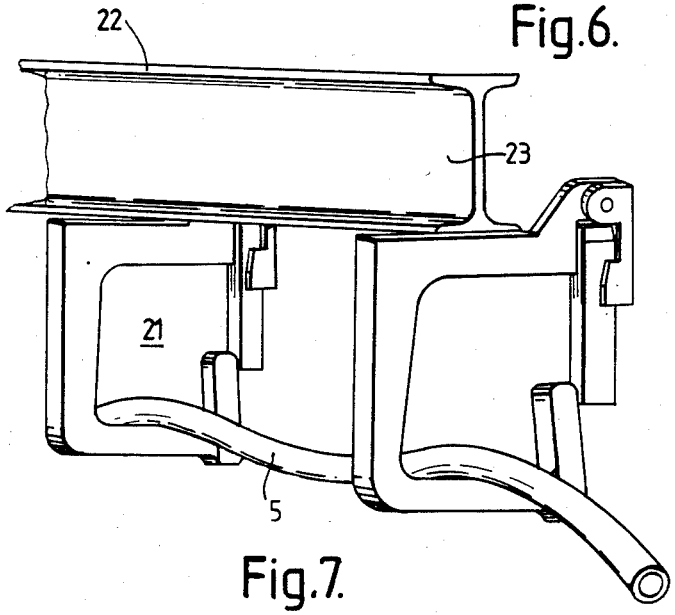
FIG. 7 is a perspective view showing the elongate member threaded through two retainer units.

The retaining units 10 are shown in greater detail in FIGS. 5 to 7. Each retainer unit 10 includes a hooked portion 18 including a vertical opening 19. Opening 19 is closed by generally vertical latching member 20 to form a closed loop 21. The retaining unit 10 is mounted on a guide track 7 such that the guide track 7 is generally perpendicular to the plane of the hook 18.

The guide track 7 is made up on lengths 22 of I-shaped metal so that two opposing channels 23 are formed. The rollers 9 of the feeder unit roll along these channels 23. The retainer units 10 are connected across the joint between two separate lengths of channel 22 to help strengthen this joint. The unit 10 is connected securely to each length of channel 22 so that the joint between the two adjacent guide tracks is secured.

The latching device 20 comprises a first latching member 24 which is pivotally mounted around pivot point 25. First latching member 24 is constructed to pivot in a direction parallel to the guide track 9. A second latching member 26 is pivotally mounted by pivot pin 27 on hook 189 so as to be pivoted in a direction perpendicular to the guide track 7. The latching member 24 is a bar-like device as shown in FIG. 7. The second latching member 26 is channel shaped with flanges 28 which may surround the bar 24. When the second latching member 26 is in its vertical position the first latching member 24 is retained vertically between flanges 28 and this cannot pivot at all. Further, when cable 5 is within loop 21 and latching member is in its vertical position, the cable 5 cannot be moved inadvertently out of retainer unit 10.

FIG. 6 shows the retainer unit 10 in its open position i.e. first condition where in the second latching member 26 has been pivoted from its vertical position thus freeing the bar 24 from flanges 28. Member 24 may then be rotated out of position to leave opening 19 open to allow passage of a cable 5 through the opening 19. The cable 5 may pass either into loop 21 to be received within retaining unit 10 or out of the opening 19 to be freed from retainer unit 10.

Figure 8:
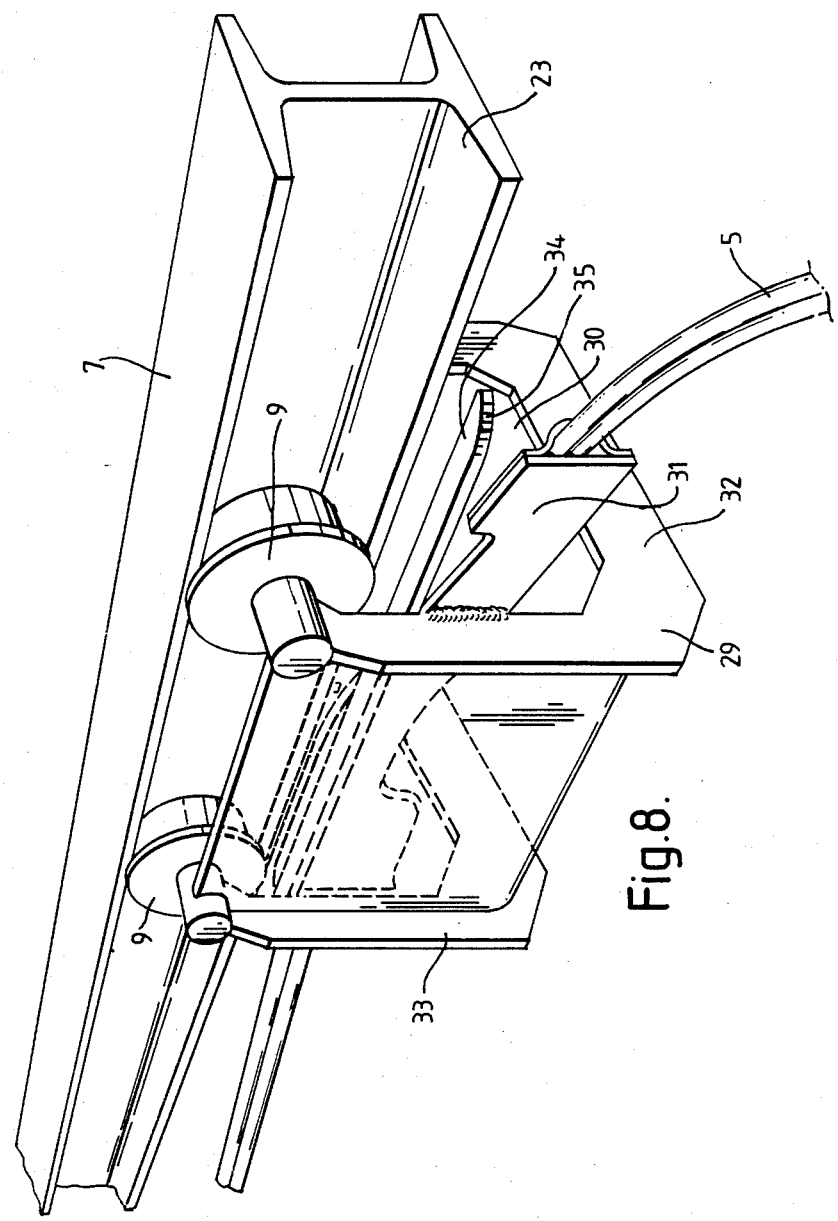
FIG. 8 is an elevated perspective view of a feeder unit in association with a retaining unit.

The structure of the feeder unit is shown in detail in FIG. 8. It has a trolley-like structure with wheels 9 which roll along the channels 23 of the guide track 7. The feeder unit 8 comprises a frame member 29 which defines an opening 30 which is large enough to allow the feeder unit to pass around the retaining unit 10.

Mounted in frame 29 is the mounting unit 31 for the cable 5. The mounting unit 31 extends diagonally of the frame 20 so that at first end 32 the elongate member 5 is at a position outside the loop of retaining unit 10 and at the second end 33 the cable 5 is at a position where it would lie within loop 21 of retaining unit 10. An elongate member 34 extends along the length of feeder unit 8 and has at each end a rounded end 35. When the feeder unit 8 is moved towards retaining unit 10, the end 35 engages second latching member 26 to cause it to be moved outwards and upwards to allow the first latching member 24 to be pushed forward by the continuing movement of the end 35 to push first latching member 24 to result in an opening 19 in the loop 21. If the feeder unit 8 is moved with end 32 leading the movement of the feeder unit 8 around the retaining unit 10 tends to thread cable 5 into the unit. Movement in the opposite direction tends to unthread the cable from the unit.

It will be seen that the system may be adapted to handle a plurality of hoses or cables.

We claim:

1. Apparatus for handling a flexible elongate member, the apparatus comprising:
    a feeder unit mounted for movement along a predetermined path, and
    at least one fixed retaining unit mounted adjacent said path, said retaining unit having a loop, defining an opening therein, and a latching means mechanically associated with said loop for closing said opening, said retaining unit having a first condition in which the elongate member may be received into or withdrawn from the retaining unit, and a second condition in which the elongate member is retained in said retaining unit, said second condition of said retaining unit being an equilibrium position of said retaining unit
    wherein said feeder unit includes means for engaging said retaining unit and altering the condition of said retaining unit from said second condition to said first condition and feeding the elongate member into the retaining unit while said retaining unit is in said first condition and
    wherein upon said feeder unit being disengaged from said retaining unit said retaining unit shifts from said first condition to said second condition due to the force of gravity; said feeder unit disengagement resulting whilst said feeder unit moves along said predetermined path in one direction.

2. Apparatus according to claim 1 in which the predetermined path of the feeder unit with respect to the retaining unit is defined by a guidetrack along which the feeder unit rolls and along which the feeder unit is mounted so that it is held in contact with the guidetrack.

3. Apparatus according to claim 2 in which the latching means comprises two members which pivot in perpendicular directions, a first latching member depending vertically downwards to close the opening of the loop and being pivoted a its top end so that it pivots in a plane parallel to the guidetrack, and a second latching member being mounted on the retaining unit to be pivoted in a direction perpendicular to the plane of pivoting of the first latching member, the second latching member including stops to retain the first latching member in position in its closed condition, so that the latching means can only be opened by moving both the first and second latching members.

4. The apparatus according to claim 3 wherein said feeder unit includes an actuator means for engaging initially said second latching member and displacing said stops of said second latching member from their retaining relationship with said first latching member; said actuator means being configured to subsequently displace said first latching member from a position closing said opening of said loop.

5. The apparatus according to claim 4 wherein said actuator means comprises an elongate member having a curved leading edge configured to engage initially said second latching member and rotate said second latching member about a horizontal axis in a generally vertical plane.

6. The apparatus of claim 3 wherein said first latching member rotates in a vertically oriented plane.

7. The apparatus of claim 3 where said second latching member rotates in a vertically oriented plane.

8. Apparatus according to claim 2 in which the feeder unit is in the form of a trolley which rolls along the guidetrack joining the retaining units.

9. Apparatus accordng to claim 1 in which there is provided a plurality of retaining units so that the elongate member may be fixed at a plurality of positions along the path.

10. Apparatus according to claim 1 in which the retaining unit is fixed onto an overhead mounting on ceiling so that the elongate member, when in the retaining unit, is retained close to the ceiling away from a working area on the floor.

11. An apparatus for handling a flexible cable, said apparatus comprising:
   an elongate track;
   at least one retaining unit associated with said track, each of said retaining units comprising:
      a loop defining an opening therein, said loop being configured to receive and retain said cable;
      a first latching member pivotedly mounted on said loop to rotate about a horizontal axis in a generally vertical plane; said first latching member being positionable in two orientations; a first orientation wherein said first latching member is removed from said opening whereby said cable is insertable into said loop through said opening and a second orientation wherein said first latching member closes said loop opening; said second orientation being an equilibrium orientation; wherein gravity urges said first latching member to return to said second orientation whenever said first latching member is displaced from said second orientation;
      a second latching member pivotedly mounted on said loop, said second latching member having a channel therein configured to receive a portion of said first latching member and thereby retain said first latching member in said second orientation,
   a feeder unit adapted to move along said track, said feeder unit comprising:
      a frame having at least one wheel rotatably mounted thereon for associating with said track permitting said feeder unit to roll along said track;
      a cable mounting associated with said frame, a proximal end of said mounting adapted to position said cable without said opening; a distal end of said mounting adapted to position said cable within said opening;
      an actuator shaft mounted on said frame, having an end adapted to contact initially said second latching member and rotate said second latching member so as to disengage said channel of said second latching member from said first latching member; said actuator end also being adapted to subsequently engage said first latching member and rotate said first latching member about its axis thereby displacing said first latching member from its second orientation and retaining said first latching member in its first orientation while said cable mounting inserts said cable into said loop;
   wherein a disengagement of said feeder unit and said retaining unit results in said first latching member returning to its second orientation solely due to the force of gravity acting on said first latching member and said second latching member subsequently returning, solely under the force of gravity, to an orientation wherein said first latching member is received within said channel of said second latching member.

* * * * *